US005129985A

United States Patent [19]

Crowley

[11] Patent Number: 5,129,985

[45] Date of Patent: Jul. 14, 1992

[54] TUBE LABEL APPLICATOR

[76] Inventor: Mark Crowley, 2028 W. Reid, Flint, Mich. 48507

[21] Appl. No.: 590,231

[22] Filed: Sep. 28, 1990

[51] Int. Cl.[5] .......... B32B 31/00

[52] U.S. Cl. .......... 156/579; 53/582; 53/585

[58] Field of Search .......... 156/579, 574, 71; 100/11; 53/582, 585, 592, 399

[56] References Cited

U.S. PATENT DOCUMENTS

| | | | |
|---|---|---|---|
| 439,994 | 11/1890 | Ballard | 29/225 |
| 2,873,564 | 2/1959 | Bogeskov | 53/3 |
| 3,072,429 | 1/1963 | Stipan | 294/19 |
| 4,246,712 | 1/1981 | Vander Wall | 40/316 |
| 4,829,750 | 5/1989 | Cassidy | 53/585 X |

*Primary Examiner*—David A. Simmons
*Assistant Examiner*—J. Sells
*Attorney, Agent, or Firm*—Krass & Young

[57] ABSTRACT

A tool which is adapted to removably engage a rolled semi-rigid, plastic label, retaining the label in an open orientation to facilitate placement of the label on a pipe. In the preferred embodiment, the tool includes an elongated handle connected to and extending outwardly from the bottom side of a base plate. A plurality of support posts attach to and extend outwardly from the top side of the base plate, and support a pair of label racks proximate the free ends of the support posts. Each of the label racks has at least one label engaging flange disposed on one side thereof. The label racks are disposed apart from one another on the support posts in an opposed, inwardly facing manner. The label engaging flanges are thus disposed in an opposed, inwardly facing surface to releasably engage opposite edges of a rolled plastic label and releaseably retain the rolled plastic label in an opened configuration for placement on the pipe. This tool is typically disposed on an extension section or bar to place labels on pipes which are a distance from the user.

27 Claims, 2 Drawing Sheets

TUBE LABEL APPLICATOR

FIELD OF THE INVENTION

The present invention relates to a tool for applying rolled, semi-rigid, plastic labels to tubular objects.

BACKGROUND OF THE INVENTION

In industrial settings, the marking of the exterior of tubular objects, such as pipes, tubes, and conduits to indicate its contents and direction of flow has become increasingly important. Commercial plants utilize literally miles of pipes, tubes, and conduits to carry various fluids. Typically, this vast pipe network is located above the work area near the ceiling supports, to place pipes out of the way of work operations. Time-consuming tracing of overhead pipe paths is often necessary to avoid the inadvertently opening unlabeled, active pipes, and to identify these conduits for maintenance purposes.

There are several known methods of externally marking the pipes, tubes, and conduits in commercial plants. Painting is a commonly used method; however, as the pipes can be more than twenty feet in the air and marked with identifying numbers, colors, text, or other markings, painting has proved to be slow, inefficient, and costly. Further, paint may not always adhere to the various pipe surfaces, such as those contaminated with corrosion or oils. Labels have been utilized as a marking device, such as these disclosed in U.S. Pat. No. 4,246,712 issued to Vander Wall. Those labels utilize self locking straps which are attached around the pipe. In each case, it becomes necessary to utilize a ladder or elevated platform to allow working in proximity to the overhead pipes. This slows the labeling process.

Rolled, semi-rigid, plastic labels have also been used to label pipes, tubes, and conduits. These labels have a coiled natural state, and are chosen for a specific pipe according to the label's coiled diameter. A coiled label of a given diameter corresponds to a pipe of slightly larger diameter. By way of example, rolled, semi-rigid, plastic labels distributed by the W H. Brady Company of Milwaukee, Wis. are manufactured in various sizes as follows:

| SIZE | PIPE DIAMETER |
|---|---|
| A | $\frac{3}{4}$"–1" |
| B | 1 $\frac{3}{8}$"–2 $\frac{3}{8}$" |
| C | 2 $\frac{1}{2}$"–3 $\frac{1}{4}$" |
| D | 3 $\frac{3}{8}$"–4 $\frac{1}{2}$" |
| E | 4 $\frac{5}{8}$"–5 $\frac{7}{8}$" |

To place the label on a pipe, the label must be unrolled, placed around the pipe, and released. The label springs closed as it returns to its natural coiled state. However, the pipe, being of a slightly larger diameter than the label, prevents the label from fully returning to its natural state. This causes the label to frictionally engage the pipe surface, securing the label in place around a pipe at a given location.

These rolled, semi-rigid, plastic labels do not require straps or other fastening devices. However, they are difficult to manually apply on overhead pipes. Each must be unrolled with two hands, held open, and positioned around the pipe at the appropriate position prior to release. This is tedious, and becomes increasingly difficult to accomplish when working on a ladder while labelling overhead pipes.

A need exists accordingly, in the industry for a tool for applying rolled, semi-rigid, plastic labels to tubular objects which avoids the problems associated with manual application of the labels.

SUMMARY OF THE INVENTION

The present invention provides a tool adapted to removably engage a rolled, semi-rigid, plastic label for placement onto tubular objects, such as pipes, conduits and tubes. The tool retains the label in an open orientation to facilitate placement.

The present invention includes a pair of label racks which are mounted on a support which attaches to a handle. Each of the label racks has at least one fixed, label-engaging flange on one side. The label racks are attached to the support and spaced apart from one another on the support in an opposed, inwardly facing fashion. This positions each of the label engaging flanges on opposed, inwardly facing surfaces of the racks at a distance from the handle. The flanges releaseably engage opposite edges of a rolled plastic label, retaining the rolled plastic label in an open configuration.

An elongated handle is affixed at one end to the support structure. The handle of the tool is preferably adapted to allow an extension section to engage the free end of the handle so that the tool can be used at a distance from the operator.

Preferably, a base plate, composed of transparent acrylic, is utilized to support the racks on the handle. This base plate allows a user of the tool to see the pipe through the base plate when viewing from below the tool. A plurality of mounting holes are disposed about the base plate to engage the racks. The supports may then engage different mounting holes to position the pair of label racks at various distances from one another to accommodate labels of different sizes for application on pipes of different diameters.

BRIEF DESCRIPTION OF THE DRAWINGS

These and other objects and aspects of the invention will become apparent in the detailed description of the invention hereinafter with respect to the drawings in which.

DESCRIPTION OF THE PREFERRED EMBODIMENT

Figure 1:
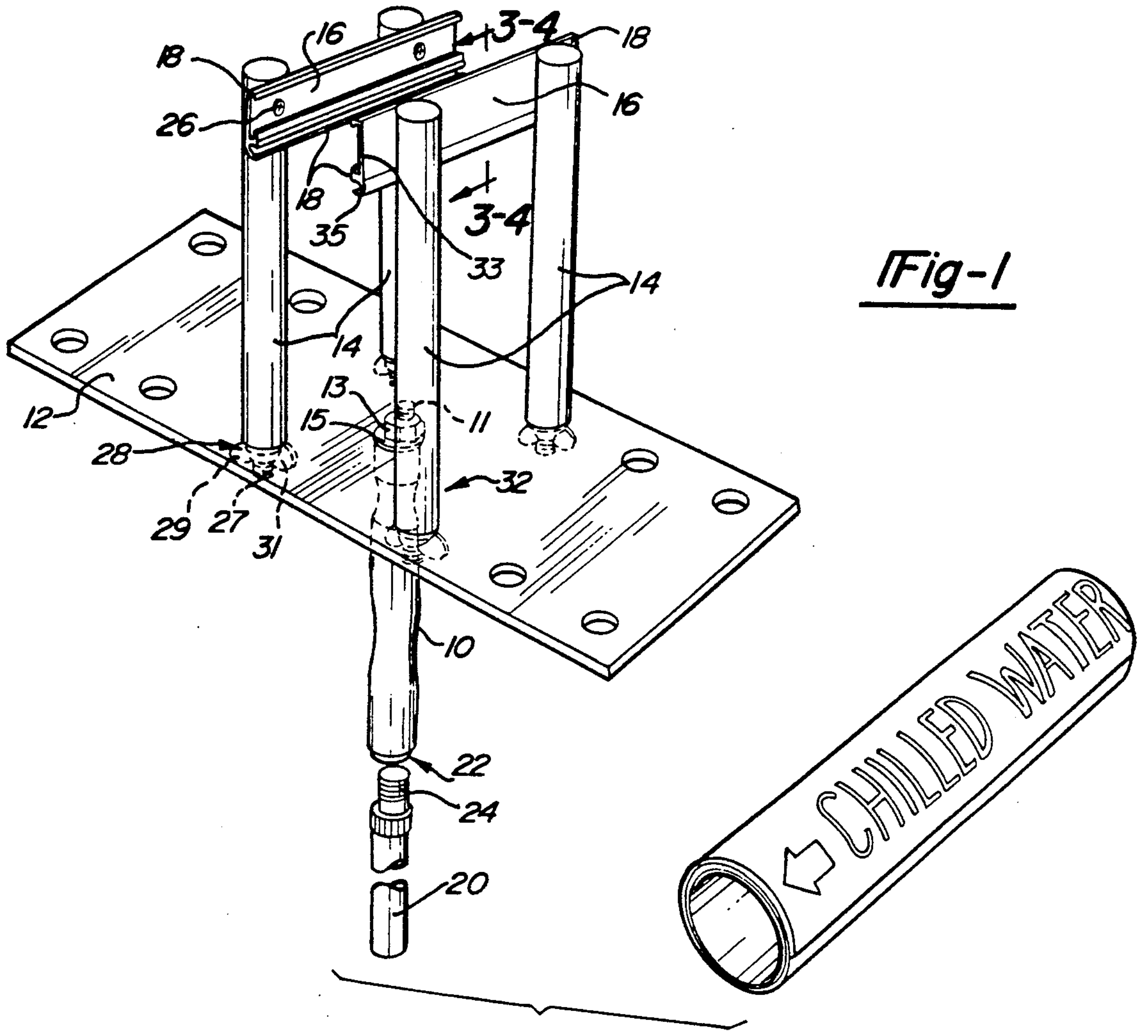
FIG. 1 is a perspective view of the invention and a typical rolled, semi-rigid, plastic label depicted in its natural coiled state.

With reference to FIG. 1, the present invention comprise a tool which is adapted to removably engage and retain a rolled, semi-rigid, plastic label in an open orientation for placement of the label on a pipe or other tubular object. The present invention includes an elongated handle 10 connected to a rigid base plate 12 having top and bottom surfaces. The base plate 12 engages the handle 10 in a manner whereby the handle 10 attaches to and extends outwardly from the bottom surface of the base plate 12. The handle 10 includes a threaded shaft 11 disposed on one end of the handle 10 which is inserted through handle mounting hole 32 and secured to the base plate 12 by nut 13 and washer 15.

The base plate 12 further engage a plurality of support posts 14 in a manner whereby the support posts 14 attach to and extend outwardly from the top surface of the base plate 12. The support posts 14 are preferably made from hollow aluminum tubing. Two of the four support posts 14 are attached to each label rack 16 utilizing rivets 26 or like fasteners proximate opposite ends of each label rack 16. This provides overall rigidity by preventing twisting of the label rack 16 during use. The support posts 14 attach to the base plate 12 utilizing anchor bolts 27 which are driven into the hollow end of the posts 14. The anchor bolts 27, extend from the end of posts 14, are then inserted through mounting holes 28 in base plate 12. Wing nuts 29 and washers 31 are threaded on the anchor bolts 27 to secure the posts 14 to the base plate 12. Typical anchor bolts are distributed by the Hilti Corporation of Tulsa, Okla. However, other methods of retaining the posts 14 to the base plate 12 can be envisioned.

To accommodate rolled labels of different sizes the posts 14 are preferably 8½" in length. This allows for the largest labels to be held in the tool without resting on base plate 12 as will be disclosed in greater detail hereinafter.

The pair of label racks 16 mount near the free ends of the support posts 14. Four support posts 14 are utilized to support a pair of label racks 16 in their preferred orientation. Each of the label racks 16 has at least one fixed, labelengaging flange 18 disposed on one side thereof. The pair of label racks 16 are disposed apart from one another on the support posts 14 in an opposed, inwardly facing manner at a distance from the base plate 12. This positions each of said label racks 16 so that the label engaging flanges 18 are disposed on opposed, inwardly facing surfaces. The flanges 18 engage opposite edges of a rolled plastic label, releaseably retaining the label in an opened configuration for placement on a pipe or other tubular object.

The label racks 16 are preferably aluminum extrusions. The stock sections include generally an upper planar section 33 and a lower tube-like section 35. The use of such stock rails allows for several flange 18 arrangements to be utilized, as will be disclosed hereinafter.

The present invention is typically adapted to utilize an extension section 20 to extend the range available to the user to place labels on distant pipes. The handle 10 of the tool can be recognized as similar to a paint roller handle and preferably includes a recess 22 adapted to engage a threaded segment 24 of extension section 20. The tool can be used at a distance from the operator corresponding to the length of the extension section 20. This extension section 20 is preferably configured as a telescopic pole to facilitate storage. However, it should be understood that a fixed length extension section 20 may also be utilized without departing from the scope of the invention herein.

Typically, the present invention is used overhead. Therefore, the base plate 12 is preferably made from transparent 3/16" acrylic sheet stock to allow the pipe to be seen through the base plate 16 when viewed from below the tool.

Figure 2:
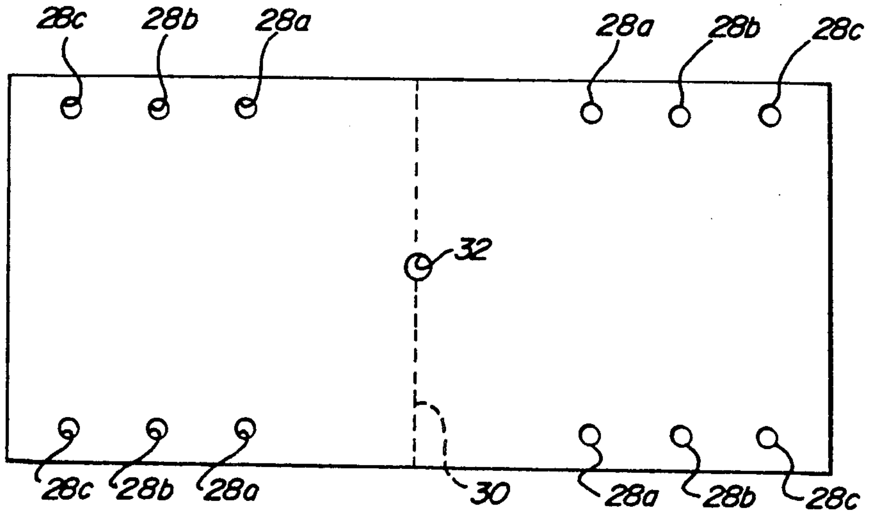
FIG. 2 is an overhead view of the base plate of the invention showing the preferred orientation of mounting holes to allow for different rack positions.

With reference to FIG. 2, base plate 12 includes a plurality of mounting holes 28 disposed about said base plate 12. The number of mounting holes 28 is preferably greater than the number of the support posts 14. The support posts 14 may engage different mounting holes 28 to position the pair of label racks 16 at various distances from one another to accommodate labels of different sizes for application on pipes of different diameters. At least eight and preferably twelve mounting holes are utilized to accommodate any of a plurality of label sizes.

Specifically, using centerline 30 through central mounting hole 32 as a reference, individual pairs of mounting holes 28 are positioned on each side of centerline 30 to accommodate various labels. Mounting holes 28A are positioned 5" apart, or 2½" on either side of centerline 30. Mounting holes 28A correspond to "Brady" label sizes A and B. Since the maximum pipe diameter for these labels is 2⅜", the 5" gap between the mounting posts 14 is sufficiently wide. In like manner, mounting holes 28B are positioned 8" apart, or 4" on either side of centerline 30 and correspond to "Brady" label size C. Finally, mounting holes 28C are positioned 11" apart, or 5½"on either side of centerline 30 and correspond to "Brady" label sizes D and E.

While the present invention is preferably made in the foregoing adjustable manner, a fixed tool can be produced for a given size label or otherwise providing a fixed connection without departing from the invention herein.

Figure 3:
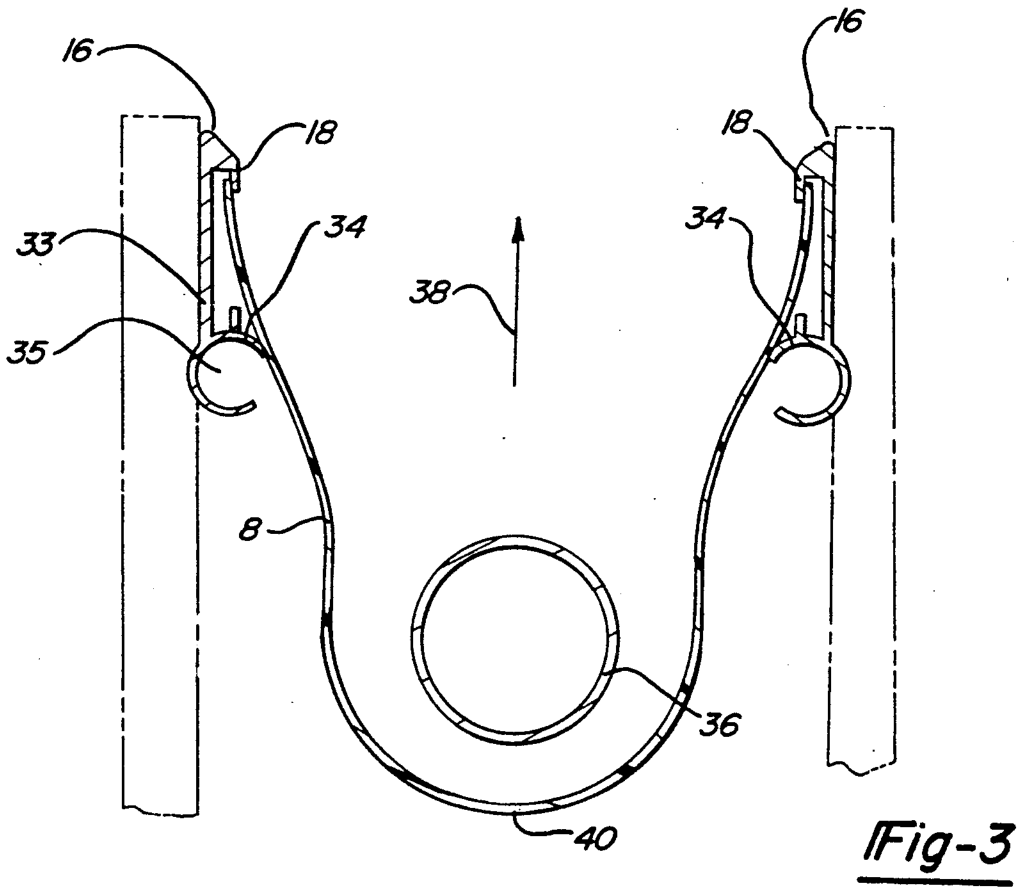
FIG. 3 is a cutaway view along line 3-4 of the label rack of the invention as shown in FIG. 1 having a label disposed therewith.
Figure 4:
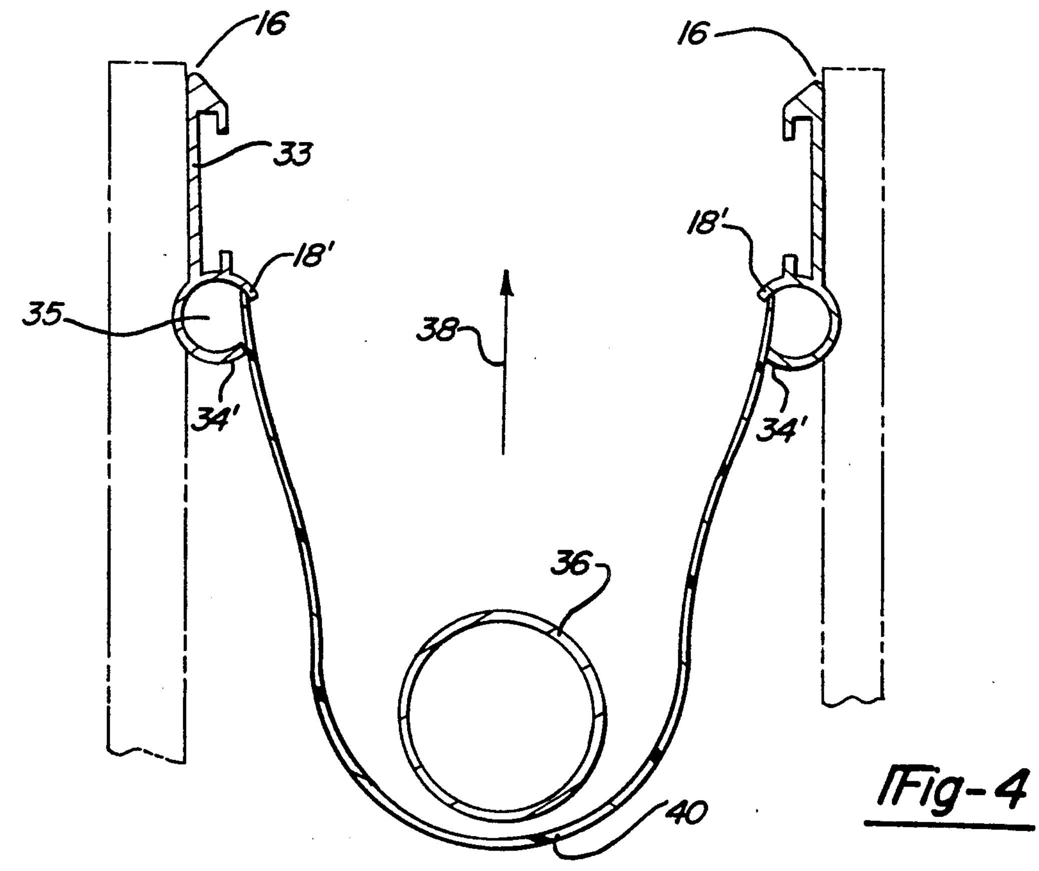
FIG. 4 is a cutaway view along line 3-4 of the label rack of the invention as shown in FIG. 1 having a label disposed in a second preferred manner therewith.

The rolled, semi-rigid, plastic labels 8 have a natural coiled state, as depicted in FIG. 1. With reference to FIGS. 3 and 4, when unrolled and retained in the present invention, the labels 8 are biased by the forces tending to return the label 8 to its natural state. This causes each edge of the label 8 to frictionally engage the corresponding inside face of flange 18 securing the label 8 into the invention.

Typically, the pair of label racks 16 will further include a label support 34 disposed on the same side of the rack 16 as the flange 18. The label support 34 will be positioned between the flange 18 and the base plate 12 when the tool is assembled. In this manner, one side of the label 8 proximate its edge abuts the inner edge of the flange 18 and the other side of the label 8 inwardly of the edge abuts the label support 34. This aids in releaseably engaging opposite edges of a rolled label 8 and retaining the rolled label 8 in an opened configuration for placement on a tubular object 36.

With reference to FIG. 3, the label 8 is retained by upper flange 18 and the outside surface of tube-like section 35 operates as label support 34. The label support 34 in this embodiment is configured to extend away from the rack 16 a greater distance than the flange 18 extends from the rack 16. This emphasizes the forces resulting from the tension in the label 8 when retained in an open configuration.

Alternatively, with reference to FIG. 4, the tube-like section 35 can be utilized to provide both the flange 18' and the label support 34'. The label 8 is inserted into the slot in tube-like section 35 and the forces operating on the label 8 cause it to engage the inside of the upper lip as a flange 18' and press against the outside edge of the lower lip as a label support 34'. This configuration does not provide for a label support which extends beyond the flange 18'. As such, it does not enhance the gripping nature of the label 8 as greatly as does the previous embodiment.

In either case, the label 8 is releaseably secured between rack sections 16. To attach the label 8 to a pipe 36, the opened label 8 is positioned around the pipe 36. The tool is moved in the direction of arrow 38 until the bottom-most point 40 of the label 8 contacts the pipe 36. Continued movement of the tool in the direction of arrow 38 thereafter causes the label 8 to release from the flanges 18 and coil itself around the pipe 36. Since the label 8 is never actually secured to the tool, but rather is merely held by the force associated with returning to its natural state, the label 8 consistently releases from both flanges 18 and wraps around the pipe 36. Therefore, it can be readily seen that the bottom-most point 40 must not rest on base plate 12 so as to prevent the continued movement of the tool and release of the label.

From the foregoing description of the preferred embodiment it can be seen that various alternative embodiments of the invention can be anticipated without departure from the scope of the invention as defined in the following claims.

I now claim:

1. A tool for applying rolled, semi-rigid labels onto tubular objects, comprising:

an elongated handle;

a pair of label racks, each of said racks having at least one fixed label-engaging flange disposed on at least one side thereof; and means for supporting said label racks at a distance from said handle and apart from one another in an opposed, inwardly facing manner and having said label engaging flanges on opposed, inwardly facing surfaces, whereby said pair of racks are adapted to releaseably engage opposite edges of a rolled label to retain the rolled label in an opened configuration for placement on a tubular object.

2. The invention of claim 1, said tool further comprising an extension section adapted to engage a free end of said elongated handle so that the tool can be used at a distance from the operator.

3. The invention of claim 1, wherein each of said pair of label racks further includes a label support disposed on the same side of said rack as said flange, said label support lying between said flange and said handle so that said pair of label racks are adapted to releaseably engage opposite edges of a rolled label by having one side of the label abut said flange and the other side of said label abut said label support to retain the rolled label in an opened configuration for placement on a tubular object.

4. The invention of claim 3, wherein said label support is configured to extend away from said rack a greater distance than said flange extends from said rack.

5. The invention of claim 1, wherein said means for supporting said label racks includes a base plate, and a plurality of support posts extending from one side of said base plate, said base plate being configured to engage one end of said handle, such that said handle extends from the other side of said base plate.

6. The invention of claim 5, wherein said support posts are removeably attached to said base plate.

7. A tool for applying rolled, semi-rigid, labels onto tubular objects, comprising:

an elongated handle having attachment means disposed on one end thereof;

a rigid base plate having top and bottom sides, said base plate having a centrally disposed mounting hole adapted to engage said attachment means on said handle so that said handle attaches to and extends outwardly from the bottom side of said base plate;

a pair of label racks, each of said racks having at least one label engaging flange disposed on one side thereof; and means for supporting said label racks at a distance from said base plate and apart from one another in an opposed, inwardly facing manner having said label engaging flanges on opposed, inwardly facing surfaces, whereby said pair of label racks are adapted to releaseably engage opposite edges of a rolled label to retain the rolled label in an opened configuration for placement on a tubular object.

8. The invention of claim 7, said tool further comprising an extension section adapted to engage an end of said elongated handle opposite said attachment means so that the tool can be used at distance from the operator.

9. The invention of claim 7, wherein said extension section comprises a telescopic pole.

10. The invention of claim 7, wherein each of said pair of label racks further includes a label support disposed on the same side of said rack as said flange, said label support lying between said flange and said handle so that said pair of label racks are adapted to releaseably engage opposite edges of a rolled label by having one side of the label abut said flange and the other side of said label abut said label support to retain the rolled label in an opened configuration for placement on a tubular object.

11. The invention of claim 10, wherein said label support is configured to extend away from said rack a greater distance than said flange extends from said rack.

12. The invention of claim 7, wherein said base plate is composed of a transparent material to allow a user of the tool to see the tubular object through said base plate when viewing from below the tool.

13. The invention of claim 7, wherein said base plate includes a plurality of mounting holes disposed about said base plate, and said means for supporting said label racks includes at least one support post attached to each of said label racks proximate a first end of said support post, and post attachment means attached to a second end of each said support post, each of said post attachment means engaging one of said plurality of post mounting holes in said base plate so that each said support posts attaches to and extends outwardly from the top side of said base plate.

14. The invention of claim 13, wherein said means for supporting said label racks comprises four support posts, two of said four support posts being attached to each said label rack proximate opposite ends of each said label rack.

15. The invention of claim 13, wherein said plurality of mounting holes disposed about said base plate includes mounting holes equal in number to said support posts.

16. The invention of claim 13, wherein said plurality of mounting holes disposed about said base plate includes a number of mounting holes which is greater than the number of support posts so that said support posts may engage different mounting holes to position said pair of label racks at various distances from one another to accommodate labels of different sizes for application on tubular objects of different diameters.

17. A tool for applying rolled, semi-rigid, labels onto tubular objects, comprising:

an elongated handle having attachment means disposed on one end thereof;

a pair of label racks, each of said racks having at least one label engaging flange disposed on one side thereof, and each of said pair of label racks further including a label support disposed on said one side of said rack; and means for supporting said label racks at a distance from said handle and apart from one another in an opposed, inwardly facing manner and having said label engaging flanges on opposed, inwardly facing surfaces with said label support lying between said flange and said handle, whereby said pair of label racks are adapted to releaseably engage opposite edges of a rolled label by having one side of the label abut said flange and the other side of said label abut said label support to retain the rolled label in an opened configuration for placement on a tubular object.

18. The invention of claim 17, wherein said label support is configured to extend away from said rack a greater distance than said flange extends from said rack.

19. A tool for applying rolled, semi-rigid, plastic labels onto tubular objects, comprising:

an elongated handle having attachment means disposed on one end thereof;

a transparent, rigid base plate having top and bottom sides, said base plate having a centrally disposed mounting hole adapted to engage said attachment means on said handle so that said handle attaches to and extends outwardly from the bottom side of said base plate;

a pair of label racks, each of said racks having at least one label engaging flange disposed on one side thereof, and each of said pair of label racks further including a label support disposed on said one side of said rack; and means for supporting said label racks at a distance from said base plate and apart from one another in an opposed, inwardly facing manner having said label engaging flanges on opposed, inwardly facing surfaces with said label support lying between said flange and said base plate, whereby said pair of label racks are adapted to releaseably engage opposite edges of a rolled plastic label by having one side of the label abut said flange and the other side of said label abut said label support to retain the rolled label in an opened configuration for placement on a tubular object.

20. The invention of claim 19, said tool further comprising an extension section adapted to engage an end of said elongated handle opposite said attachment means so that the tool can be used at a distance from the operator.

21. The invention of claim 20, wherein said extension section comprises a telescopic pole.

22. The invention of claim 19, wherein said label support is configured to extend away from said rack a greater distance than said flange extends from said rack.

23. The invention of claim 19, wherein said base plate includes a plurality of mounting holes disposed about said base plate, and said means for supporting said label racks includes at least one support post attached to each of said label racks proximate a first end of said support post, and post attachment means attached to a second end of each said support post, each of said post attachment means engaging one of said plurality of post mounting holes in said base plate so that each said support posts attaches to and extends outwardly from the top side of said base plate.

24. The invention of claim 23, wherein said means for supporting said label racks comprises four support posts, two of said four support posts being attached to each said label rack proximate opposite ends of each said label rack.

25. The invention of claim 23, wherein said plurality of mounting holes disposed about said base plate includes mounting holes equal in number to said support posts.

26. The invention of claim 23, wherein said plurality of mounting holes disposed about said base plate includes a number of mounting holes which is greater than the number of support posts so that said support posts may engage different mounting holes to position said pair of label racks at various distances from one another to accommodate labels of different sizes for application on tubular objects of different diameters.

27. A tool for applying rolled, semi-rigid, plastic labels onto tubular objects, comprising:

an elongated handle unit comprising a handle element and a removable extension section, said handle element having attachment means disposed on one end thereof, said extension section being telescopic and adapted to removably engage the other end of said handle element so that the tool can be used at a distance from the operator;

a transparent, rigid base plate having top and bottom sides, said base plate having a centrally disposed mounting hole adapted to engage said attachment means of said handle element so that said handle element attaches to and extends outwardly from the bottom side of said base plate, said base plate further having at least eight post mounting holes disposed about said base plate;

a pair of label racks, each of said racks having at least one label engaging flange disposed on one side of said rack, and each said rack further including a label support disposed on said one side of said rack, said label support being configured to extend away from said rack a greater distance than said flange extends from said rack; and four support posts, two of said four support posts being attached to each said label rack proximate one end of each said support post and proximate opposite ends of each said label rack, each of said four support posts having post attachment means disposed on the other end thereof to removeably engage four of said plurality of post mounting holes in said base plate so that said support posts attach to and extend outwardly from the top side of said base plate and said pair of label racks are disposed apart from one another in an opposed, inwardly facing manner at a distance from said base plate having said label engaging flanges on opposed, inwardly facing surfaces with said label support lying between said flange and said base plate, whereby said support posts are adapted to engage different post mounting holes to position said pair of label racks at various distances from one another and said pair of label racks are adapted to releaseably engage opposite edges of a rolled plastic label by having one side of the label abut said flange and the other side of said label abut said label support to retain the rolled plastic label in an opened configuration for placement on tubular objects of various diameters.

* * * * *